United States Patent [19]

Stannard et al.

[11] Patent Number: 4,692,248

[45] Date of Patent: Sep. 8, 1987

[54] DRUM FILTER WITH RESIN BOUND PARTICULATE FILTER MEDIA

[75] Inventors: Forrest B. Stannard, Inverness; Edward J. Highstreet, Crystal River, both of Fla.

[73] Assignee: The Dehydro Corporation, Charlotte, N.C.

[21] Appl. No.: 833,000

[22] Filed: Feb. 26, 1986

[51] Int. Cl.$^4$ .............................................. B01D 33/02
[52] U.S. Cl. .............................. 210/403; 210/416.1; 210/510.1
[58] Field of Search ................... 210/174, 403, 416.1, 210/510.1

[56] References Cited

U.S. PATENT DOCUMENTS

| | | | |
|---|---|---|---|
| 1,630,274 | 5/1927 | North | 210/403 |
| 1,650,434 | 11/1927 | Daman | 210/403 |
| 3,349,916 | 10/1967 | Magson | 210/143 |
| 4,198,299 | 4/1980 | Ewing et al. | 210/403 |
| 4,236,999 | 12/1980 | Burgess et al. | 210/403 |
| 4,368,125 | 1/1983 | Murray | 210/403 |
| 4,452,698 | 6/1984 | Roberts et al. | 210/510.1 |
| 4,458,059 | 7/1984 | Fields | 210/510.1 |

Primary Examiner—Richard V. Fisher
Assistant Examiner—Jeffrey W. Peterson
Attorney, Agent, or Firm—Carroll F. Palmer

[57] ABSTRACT

Improved devices for filtration of fluid suspensions that form flow resistant filter cakes, e.g., waste-water treatment sludges, have a cylindrical filter unit mounted for rotation about an approximately horizontal axis. Influent is charged in one end, filter cake forms on an inner rigid filter media surface and discharges at the other end. Pressurized air is applied along a top, longitudinal area and vacuum assist is applied along a bottom longitudinal area of the rotating filter unit. In preferred embodiments, the cylindrical unit is formed of wire spirally wound into a cylinder with spaces therebetween, there are a plurality of spaced apart bars fixed normal to the helical wire on the inner surface and rigid filter media formed of particulate material bonded in a resin matrix fills the cavities between the bars and covers the wire spirals.

9 Claims, 7 Drawing Figures

DRUM FILTER WITH RESIN BOUND PARTICULATE FILTER MEDIA

BACKGROUND OF THE INVENTION

1. Field of the Invention

This invention relates to improved devices for filtration of fluid suspensions that form flow resistant filter cakes. More particularly, it concerns (a) devices for the filtering of wastewater treatment sludges or similar material that is prone to form filter cake very resistant to flow of filtrate through it and (b) methods for filtering such material at a relatively rapid rate to obtain truckable cake of relatively high solids content.

2. Description of the Prior Art

There are a variety of liquid suspensions encountered today in large amounts that must have liquid removed therefrom inexpensively to produce a filtrand of substantially increased solids content that may be handled, such as by trucking, to disposal. For example, the treatment of municipal wastewater produces large amounts of sludges that present a myriad of problems in handling and disposal. Further, continued residential, commercial and industrial developments require the provision of ever increasing wastewater treatment capacity, resulting in a corresponding increase in plant effluent and by-products. The disposal of the resulting sludge and related materials becomes ever more serious, not only because of the increase in their total volume, but also because of the increase in disposal restrictions imposed by environmental regulations.

While the invention is described with particular reference to wastewater sludge dewatering, the new devices and methods may be effectively used for the filtration of a wide spectrum of other fluid suspensions of particulate material.

In the operation of sewage treatment plants and the process of dewatering sewage sludge as a step in disposing of it, the sludge influent to the dewatering step will contain about 0.5% to 5% solids. In order to handle the sludge as a "dry product" for trucking to a disposal site, the sludge should contain at least about 10% solids.

Wastewater treatment sludges can be divided into a few basic types, e.g., alum sludge (chemical), hard sludge, aerobic domestic sewage sludge (bio-mass) and anerobic digested domestic sewer sludge (bio-mass). The present invention relates to new methods capable of handling all of such classes of sludge.

Typical filter apparatus for sludge dewatering is an open tank containing a bed of loose sand supported on a lower bed of gravel which, in turn, is supported upon the floor of the tank, usually made of concrete. This type equipment is referred to in the trade as GFM equipment, i.e., granular filter media equipment (see for example U.S. Pat. No. 1,802,726).

As water is removed from the influent in such equipment a filter cake builds up on the top of the sand layer until the cake contains about 6% solids. Depending upon the amount of time the sludge charge is allowed to remain in the equipment, it can be dewatered up to about 12-45% solids. The sludge is removed from the sand bed by shovels, back-hoes or other scraping or scooping devices. Usually a thin layer of sludge will remain on the top of the sand bed and will hinder the dewatering of the next batch of influent. Rakes or scrapers are often used to remove this sludge residue, but this can result in loss of sand requiring replenishment of the sand bed. Furthermore, this GFM type sludge dewatering is undesirably slow and requires large area filters to attain needed throughput. Land acquisition costs, therefore, can be high.

Because of the problems associated with GFM dewatering of sewage sludge, much work has been done on the development of other types of dewatering methods and equipment. Another type of sludge dewatering apparatus uses a rigid bed or plate of solid particles bound in a matrix of cured resin in place of the conventional sand bed. This type of equipment is referred to as RFM equipment, i.e., rigid filter media equipment and examples of RFM devices are disclosed in the following U.S. Pats. Nos. 4,208,288, 4,309,292, 4,340,478, 4,382,863, 4,381,998, 4,399,042, 4,431,549, 4,452,698, 4,481,114.

Still other developments in sludge dewatering have included (a) vacuum assisted rotating filters (see U.S. Pat. No. 2,230,385; (b) rotary vacuum drums (see U.S. Pat. No. 3,338,412); (c) pressurized vessels (see U.S. Pat. No. 3,397,140) and (d) vacuum assisted horizontal moving belt filters (see U.S. Pat. No. 4,217,219).

The use of vacuum to improve the efficiency of filtering operations was well known much prior to the vacuum filtering operations mentioned above with regard to sludge dewatering (see U.S. Pat. Nos. 809,861; 1,135,080 and 1,595,344). Also the concept of vacuum assist has been used in the dewatering of other sludges than sewage sludge, e.g., sludges generated in the metal, mining and chemical industries (see U.S. Pat. Nos. 3,870,641 and 3,929,642).

In addition to horizontal, rotary filter equipment mentioned above, numerous other devices of this general type have been developed including some with external or internal longitudinal spray units, hot air applicator and slotted screen drums as shown by:

U.S. Pat. Nos. 983,735, 2,257,686, 3,117,927, 3,979,289, 4,198,299, 4,248,709, 4,306,975, 4,439,320.

The present invention provides new improvements in filtering and dewatering equipment that comprise rotary filter equipment in unique combinations with other essential units and in filtering methods that utilize such equipment.

OBJECTS

A principal object of the invention is the provision of new improvements in filter devices and methods.

Further objects include the provision of:

1. New equipment for the rapid filtration of sewage sludge or similar fluid suspensions prone to form a filter cake resistant to the flow of liquid.

2. New forms of filtration devices.

3. New systems for the use of vacuum assist in the dewatering of fluid suspensions of particulate material.

4. New systems for the use of forced air to aid in drying of flow resistant filter cake as well as assisting in removing the filter cake from the filter media.

5. New forms of filter apparatus using continuously drums to increase the rate of dewatering and to reduce problems in the handling of dewatered sludge.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The stated objects are accomplished, in part, in accordance with the invention by the provision of improved devices for filtration of fluid suspensions that basically comprise a cylindrical filter unit with an internal cylindrical filter surface mounted for rotation about an approximately horizontal axis, first longitudinal means positioned atop the filter unit to force pressurized gas through the cylindrical surface from the back side thereof, and second longitudinal means beneath the filter unit to apply a vacuum to the filter unit to assist in removal of liquid therefrom by suction. Additionally, there may be third longitudinal means for applying heated gas internally of the filter unit.

The cylindrical filter unit has an inlet end, an outlet end and therebetween there is an internal, cylindrical surface defined by rigid filter media. There is also means to introduce influent to be filtered into the inlet end and means to receive filtered solid material discharged from the outlet end.

In preferred embodiments, the filter unit has an external porous wall formed of spirally wound wire with substantially uniform spacings between each revolution of the wire. Such wall also has a plurality of spaced-apart bars fixed normal to the spiralled wire on the inner surface thereof forming a multitude of cavities between the bars above the wire. The cavities contain the rigid filter media formed of particulate material bound in a resin matrix covering the inner surface of the wire and filing the cavities.

In some embodiments, the bars are trapezoidal in cross-section with the shortest parallel sides thereof being fixed to the wire so the cavities therebetween are wider at their base than at their open faces. In other embodiments, the rods are circular in cross-section and the cavities are filled with the rigid filter media to the level defined by the inner tips of such rods.

The inlet ends of the filter units are preferably closed except for the means to introduce influent. Also, the first longitudinal means comprises an elongated channel member with its open portion facing and effectively in contact with the outside surface of the tubular member and there is a conduit joined to the channel member for introducing pressurized air into the space between the channel member and the outside surface.

Further, the second longitudinal means preferably comprises an enclosed U-shaped chamber having a horizontal base and vertical sidewalls, the upper ends of the sidewalls being effectively in contact with the outside surface of the tubular member and there is a conduit joined to the base to remove liquid from the chamber and means to apply suction to the conduit.

Also, the third longitudinal means advantageously comprises an elongated tube extending through the outlet end of the filter unit into the interior of the tubular member and there are a plurality of downwardly directed nozzles spaced apart on the tube for delivery of fluid from the tube into the interior of the tubular member.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
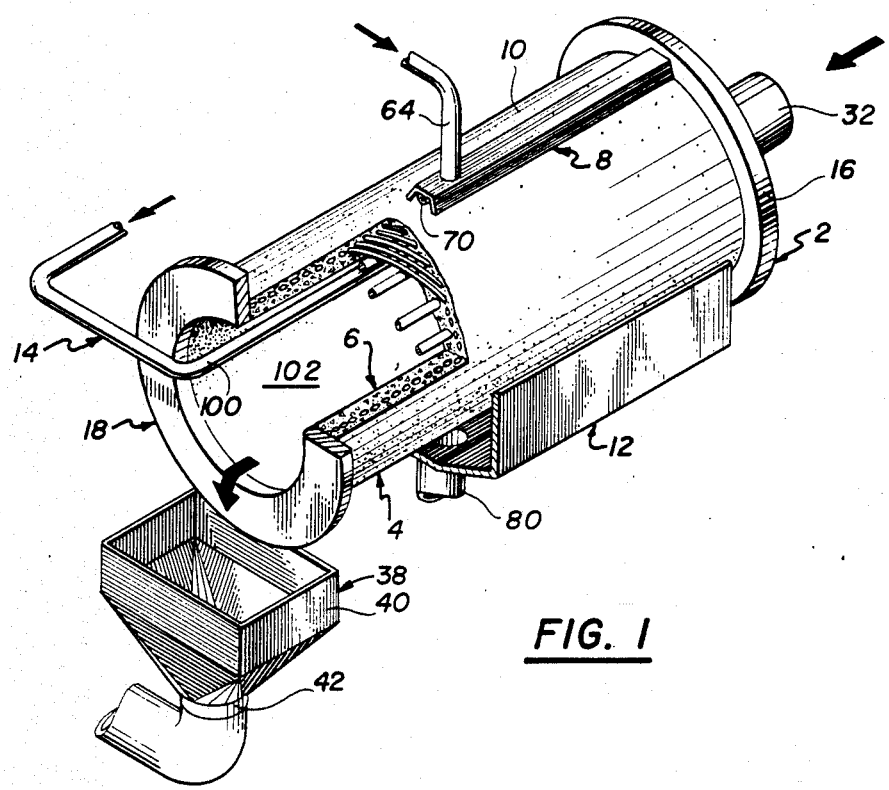
FIG. 1 is an isometric view of a filter device constructed in accordance with the invention.
Figure 2:
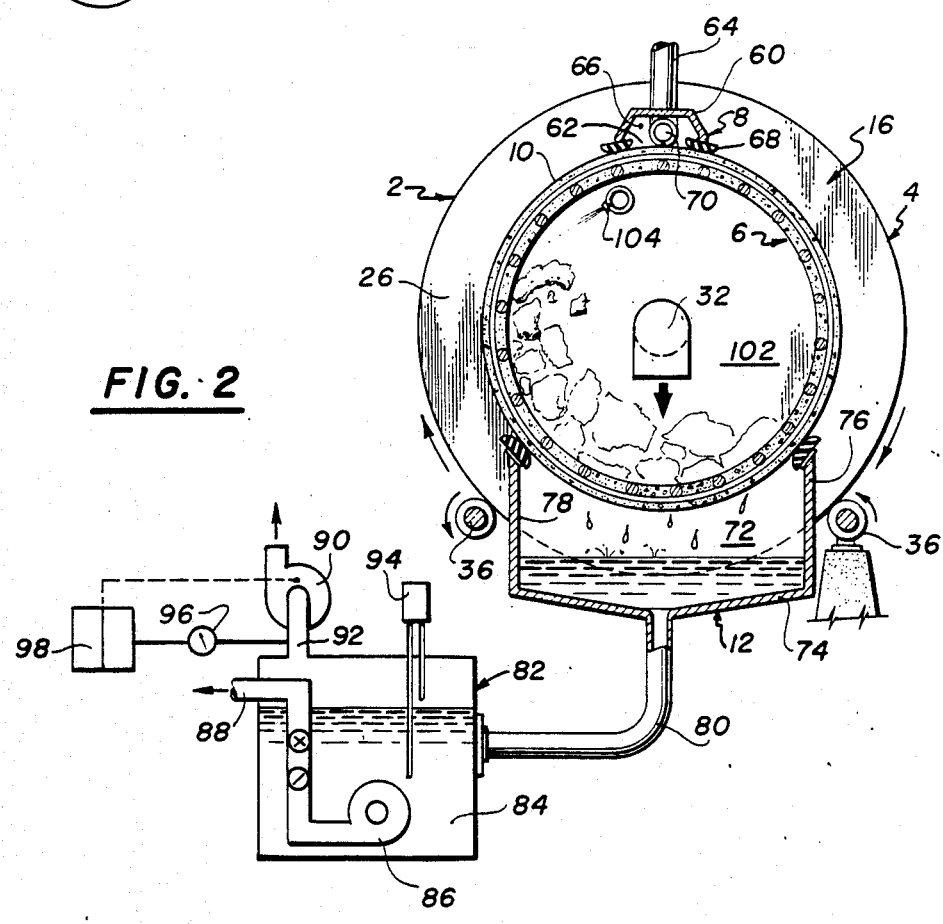
FIG. 2 is an end view partially in section of the filter device of FIG. 1.
Figure 3:
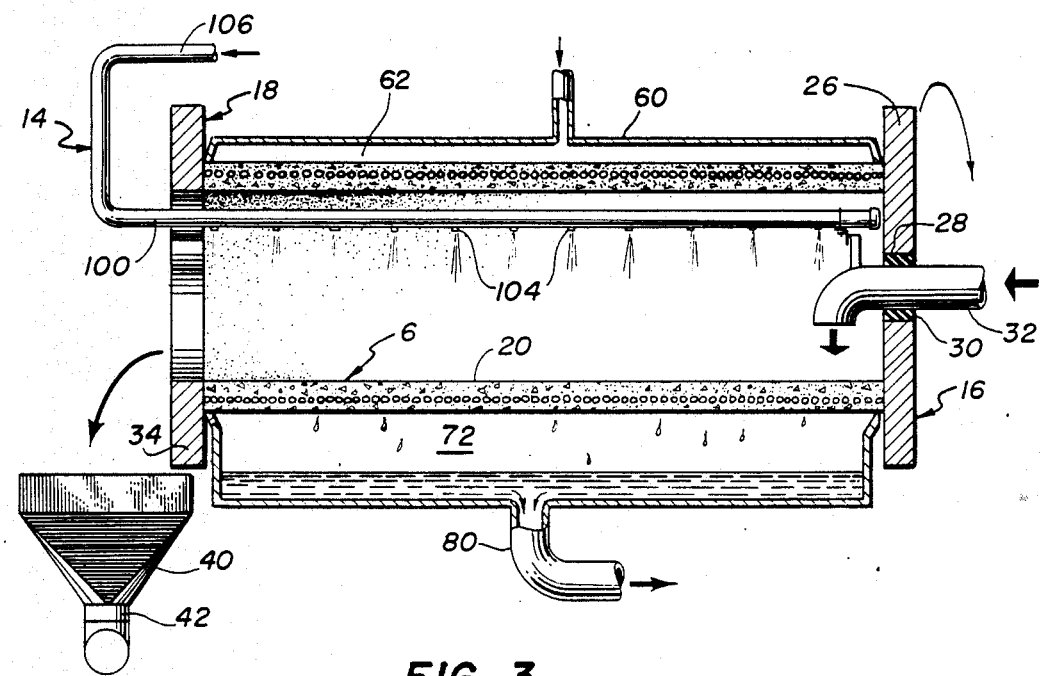
FIG. 3 is lateral sectional view of the device of FIG. 1.

Referring in detail to the drawings, in which identical parts are identically marked, the filter device 2 of the invention comprises a cylindrical filter unit 4 with an internal cylindrical filter surface 6 mounted for rotation about an approximately horizontal axis. There is a first longitudinal means 8 positioned atop the filter unit 4 to force pressurized gas through the cylindrical surface 6 from the back side 10 thereof.

A second longitudinal means 12 beneath the filter unit 4 is designed to apply a vacuum to the filter unit 4 to assist in removal of liquid therefrom by suction. Additionally, there is third longitudinal means 14 for applying heated gas internally of the filter unit 4.

The cylindrical filter unit 4 has an inlet end 16 and an outlet end 18. Between these is the internal surface 6 which is in the form of a rigid filter media consisting of particulate material 22 bound in a resin matrix 24.

The inlet end 16 closed by the circular plate 26 which has a central opening 28 and seal 30 through which the conduit 32 extends to serve as means to introduce influent to be filtered into the inlet end 16.

The outlet end 18 has a ring member 34 through which filtered solid material generated in the device 2 may be discharged from the outlet end.

The plate 26 and ring member 34 rest on rollers 36 which support the unit 4. The rollers are driven by motor means (not shown) to rotate the unit 4 for the filtering of influent charged through conduit 32.

The means 38 to receive material discharged from the outlet end 18 comprises a hopper 40 and conduit 42 which connects to suitable external equipment (not shown) such as a conveyor, truck loader, etc.

Figure 4:
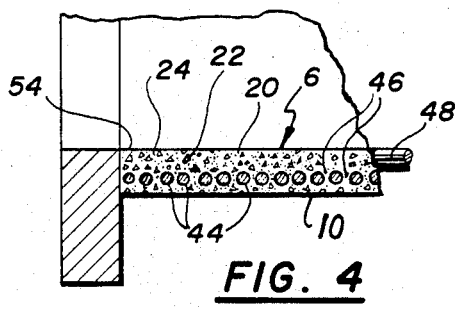
FIG. 4 is a fragmentary, sectional view of a portion of a filter device of the invention.
Figure 5:
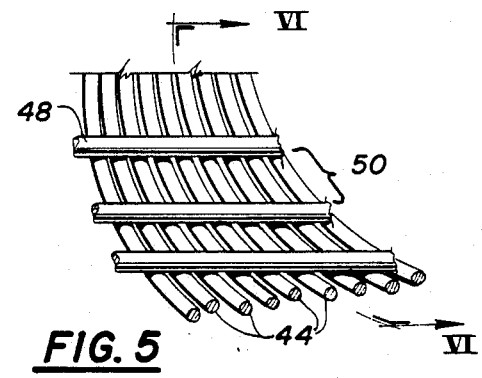
FIG. 5 is a fragmentary, isometric view of a portion of a filter device of the invention.
Figure 6:
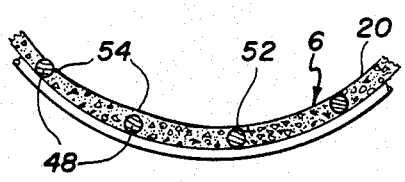
FIG. 6 is a fragmentary, sectional view taken on the line VI—VI of FIG. 5.

As shown in FIGS. 4–6, the filter unit 4 its external porous wall 10 is formed of spirally wound wire 44 with substantially uniform spacings 46 between each revolution of the wire 44. Such wall 10 also has a plurality of spaced-apart bars 48 fixed normal to the spiralled wire 44 on the inner surface thereof forming a multitude of cavities 50 between the bars 48 above the wire 44. The cavities 50 contain the rigid filter media 20 covering the inner surface of the wire 44 and filing the cavities 50 preferably to the level defined by the inner tips 52 of the bars 48. However, the inner (top) surface 54 of the media 20 may be below this level. Alternatively, such surface 54 may be above the level of the tips 52 so that the media 20 completely covers the bars 48. The surface 54 is preferably smooth to assist in the movement of filtered material over it, but it may be, alternatively, grooved longitudinally or transversely or otherwise contoured.

Figure 7:
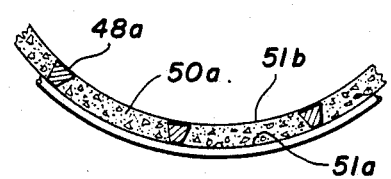
FIG. 7 is a fragmentary, sectional view of another embodiment of a portion of the filter device shown in FIG. 6.

In embodiments of FIGS. 4-6, the bars (rods) 48 are circular in cross-section. In the embodiments of FIG. 7, the bars 48a are trapezoidal in cross-section with the shortest parallel sides thereof being fixed to the wire 44 so the cavities 50a are wider at their base 51a than at their open faces 51b.

The bars 48 and 48a are preferably fixed to the wires 44 by weldments at the junctions of the bars and wires.

The particulate material used in the rigid filter media 20 is preferably of relatively uniform size between about 5 10 35 mesh size (standard sieve) and especially between about 10 to 18 mesh size. The particulate material preferably constitutes about 50 to 95% by weight of the filter media 20 and may be selected from a variety of commercially available materials inert to the influents to be filtered in the devices 2. Crushed and sized alumina is a preferred material. Alternatives include, ceramics, plastic particles, anthracite, silicon carbide, garnet, and like materials extensively used in the coated abrasives industry.

The resin preferred for use as the matrix material in the media 20 is epoxy resin. Other resins capable of conversion to a cured, hard condition may be used, e.g., phenol-aldehyde resins, polyester resins, urea-aldehyde resins, resorcinol-aldehyde resins and equivalent curable resins.

The filter unit is prepared by forming a fluid mass of the uncured resin and particulate material, filling the cavities 50 on the inner surface of the wire/bar combination tube to the desired depth. The applied mass is then screed and allowed to stand until the resin cures and forms the solid filter media 20.

The first longitudinal means 8 comprises an elongated channel member 60 with its open portion 62 facing the outside surface 10 of the tubular unit 4. There is a conduit 64 joined to the channel member 60 for the introduction of pressured air or other gas into the space 66 between the chananel member 60 and the surface 10.

The open portion 62 is rendered effectively in contact with the surface 10 via the gland 68 enabling intoduction of pressurized air into the unit 4 while the surface 10 rotates across the channel member 60.

The conduit 64 may discharge directly into the channel member 60 or indirectly through a sparger pipe 70.

The second longitudinal means 12 comprises an enclosed U-shaped chamber 72 having a horizontal base 74 and vertical sidewalls 76. The upper ends 78 of the sidewalls 76 are effectively in contact with the outside surface of the tubular surface 10. A conduit 80 is joined to the base 74 to remove liquid from the chamber 72 and there is means 82 to apply suction to the conduit 80.

The suction means 82 comprises a sump tank 84, a submersible pump 86, effulent discharge pipe 88 and vacuum pump 90 joined to the tank 84 by the conduit 92. Means 82 also includes liquid level controlled unit 94, vacuum gage 96 and operation control unit 98 for the vacuum pump 90.

The third longitudinal means 14 comprises an elongated tube 100 extending through the outlet end 18 of the filter unit 4 into the interior 102 of the unit 4. There are a plurality of downwardly directed nozzles 104 space apart on the tube 100 for delivery of fluid from the tube 100 into the interior 102. The inlet 106 to tube 100 connects to a source (not shown) of hot air or other gas for use to assist in the dewatering of filtered sludge or other filtrand process in the device 2.

The operation of the devices 2 is highly effective in dewatering sludges or like materials that a difficult to filter because they form filter cakes that a resistant to flow of liquid and also tend to form cracks or fissures as their liquid content decreases.

With the filter unit 4 supported and turning on the rollers 36, influent is charged, preferably continuously, via the conduit 32 into the unit 4 to drop onto the internal filter surface 6 adjacent the closed end 16.

As the unit 4 rotates, either clockwise or counterclockwise, the influent is spread over the surface 6. At the same time, water in the spread mass flows through the media 20 into the effluent mean 12 forming a partial filter cake. The weight of the incoming influent together with the rotation of the unit 4, causes this filter cake to move toward the discharge end 18. As this occurs, the filter cake is exposed to progressively larger area of filter surface 6 as its percentage of solids increases.

The filter cake adheres in the lower quadrant to the filter surface 6 and moves upwardly toward the vertical portion by the rotating cylinder. At the apogee, the filter cake drops from the media bed.

Pressurized air forced into the channel 60 serves several functions. First, it causes the filter cake as it rotates to the top of the unit 4 to release from the filter surface 6 and drop down to the lower section of the unit 4. Also, it tends to evaporate or dislodge water from the filter cake thereby assisting in its dewatering.

Further drying of the filter cake is provided by the hot air tube 100 and nozzles 104 which is placed in the inside 102 of the unit 4 away from the concentric, longitudinal axis and at a height between the horizontal plane of that axis and below the top of the inside 102. The air nozzles 104 are directed to the filter surface 6 closest to them.

Filtrate discharged through the filter unit 4 is collected in the chamber 12 and moved thence via conduit 80 to the tank 84 for discharge through outlet pipe 88. Vacuum applied to the chamber 12 by the pump 90 assists in the removal of filtrate from the influent material.

Dewatered sludge or other filter cake is forced out the unit end 18, by the weight of sludge being processed further upstream, into the hopper 40 from whence it can be removed via the conduit 42 with the assist of a progressive cavity pump (not shown). Alternatively, the filter cake can be dropped out the bottom of the hopper 40 onto a conveyor.

The embodiments of the invention in which an exclusive property or privilege is claimed are defined as follows:

1. A filter device designed to mitigate problems in the filtration of fluid suspensions that form flow resistant filter cake resistant to the flow of liquid and thereby rapidly reduce the rate of filtration, said device comprising in combination:
    a cylindrical filter unit with means for rotation about an approximately horizontal axis, said unit having:
        a tubular member with an inlet end and an outlet end, said member comprising:
            an external porous wall formed of spirally wound wire with substantially uniform spacings between each revolution of said wire,
            a plurality of spaced-apart bars or rods fixed normal to said spiralled wire on the inner surface thereof forming a multitude of cavities between said bars or rods above said wire, and rigid filter media formed of particulate material bound in a resin matrix covering the inner surface of said wire and filling said cavities, means to introduce influent to be filtered into said inlet end, means to receive filtered solid material discharged from said outlet end, first longitudinal means positioned atop said filter unit to force pressurized gas through a cylindrical surface from the back side thereof, and second longitudinal means beneath said filter unit to apply a vacuum to said filter unit to assist in removal of liquid from said influent by suction thereof through said rigid filter media.

2. The device of claim 1 wherein said bars are trapezoidal in cross-section with the shortest parallel sides thereof being fixed to said wire so said cavities are wider at their base than at their open faces.

3. The device of claim 1 wherein said inlet end includes means closing same except for said means to introduce influent.

4. The device of claim 1 wherein said first longitudinal means comprises:

a elongated channel member with its open portion facing and effectively in contact with the outside surface of said tubular member and a tubular conduit joined to said channel member for introducing pressurized air into the space between said channel member and said outside surface.

5. The device of claim 1 wherein said second longitudinal means comprises:

an enclosed U-shaped chamber having a horizontal base and vertical sidewalls, the upper ends of said sidewalls being effectively in contact with the outside surface of said tubular member, a conduit joined to said base to remove liquid from said chamber and means to apply suction to said conduit.

6. The device of claim 1 which comprises:

a elongated tube extending through said outlet end into the interior of said tubular member and a plurality of downwardly direct nozzles spaced apart on said tube for delivery of fluid from said tube into the interior of said tubular member.

7. The device of claim 1 wherein said rods are circular in cross-section and said cavities are filled with said rigid filter media to the level defined by the inner extension of said rods.

8. The device of claim 1 comprising means for applying heated gas longitudinally and internally of said filter unit.

9. A filter device designed to mitigate problems in the filtration of fluid suspensions that form flow resistant filter cake resistant to the flow of liquid and thereby rapidly reduce the rate of filtration, said device comprising in combination:

a cylindrical filter unit with means for rotation about an approximately horizontal axis, said unit having:

a tubular member with an inlet end and an outlet end, said member comprising:

an external porous wall formed of spirally wound wire with substantially uniform spacings between each revolution of said wire, a plurality of spaced-apart bars fixed normal to said spiralled wire on the inner surface thereof forming a multitude of cavities between said bars above said wire, and rigid filter media formed of particulate material bound in a resin matrix covering the inner surface of said wire and filling said cavities, means to introduce influent to be filtered into said inlet end, means to receive filtered solid material discharged from said outlet end, first longitudinal means positioned atop said filter unit to force pressureized gas through a cylindrical surface from the back side thereof, second longitudinal means beneath said filter unit to apply a vacuum to said filter unit to assist in removal of liquid from said influent by suction thereof through said rigid filter media, and third longitudinal means for applying heated gas internally of said filter unit.

* * * * *